United States Patent
Schrink et al.

[11] 3,771,664
[45] Nov. 13, 1973

[54] FILTER SEAL

[75] Inventors: George H. Schrink, Oshtemo; Ronald D. Jarman, Brady Township, Kalamazoo County, both of Mich.

[73] Assignee: Dover Corp., Kalamazoo, Mich.

[22] Filed: July 5, 1972

[21] Appl. No.: 269,125

[52] U.S. Cl.................... 210/448, 55/373, 55/378, 210/484
[51] Int. Cl........................................... B01d 35/00
[58] Field of Search..................... 55/373, 376, 378; 210/446, 448, 450, 452, 484

[56] References Cited
UNITED STATES PATENTS

| | | | |
|---|---|---|---|
| 1,284,944 | 11/1918 | St. Pierre | 210/448 |
| 1,782,531 | 11/1930 | Fokker | 210/448 X |
| 3,355,026 | 11/1967 | Schut | 210/448 X |
| 3,640,392 | 5/1970 | Smith et al. | 210/452 X |
| 2,467,503 | 4/1949 | Scriven | 55/373 X |
| 3,387,433 | 6/1968 | Mackey | 55/373 X |

Primary Examiner—Samih N. Zaharna
Assistant Examiner—Richard W. Burks
Attorney—Woodhams, Blanchard & Flynn

[57] ABSTRACT

Filter and seal for use therein. In a filter having a mesh basket and a fabric liner contained therein for functioning as a filter medium, there is provided an elastomeric rim for engaging and holding the free edge of the liner. A filter tank and cover are arranged for holding the basket in operating position and for receiving said elastomeric rim between the tank and cover where it acts both to hold the liner similarly in operating position and also as a seal therebetween. Said seal thus comprises a multipurpose component in that it provides a fluid seal between the inside of the housing and the atmosphere, retains the rim of the fabric filter liner and supports same, seals the filtered liquid from the unfiltered liquid and insures that the fabric liner is centered in the mesh basket.

6 Claims, 3 Drawing Figures

PATENTED NOV 13 1973

3,771,664

3,771,664

FILTER SEAL

FIELD OF THE INVENTION

This invention relates to a seal for use on a basket-type solids/liquid filter.

The seal is designed as a multipurpose component since, in addition to providing a fluid seal between the inside of the housing and the atmosphere, it retains the rim of and supports the fabric filter liner, seals the filtered liquid from the unfiltered liquid and insures that the fabric liner is centered in the mesh basket.

BACKGROUND OF THE INVENTION

In the provision of filter units for industrial operations, it is a common practice to provide a filter with an inlet for the unfiltered liquid, an outlet for the filtered liquid and some type of filter medium between the inlet and outlet to retain the contaminant in the liquid. When a filter of this type is designed, a seal (or seals) is required to retain the fluid in the filter housing. A second seal must be provided to prevent mixing if the unfiltered liquid with the filtrate. In addition, a means of supporting and retaining the filter medium during flow conditions must be provided and, when a fabric liner supported by a mesh basket is used for filtering, the liner must be centered in the aforesaid basket.

In the design of many of the above-described filtering units the various purposes listed in the previous paragraph are performed by separate components of the filter. Separate seals are utilized to seal the housing and to separate the filtered liquid from the unfiltered liquid. Another component is provided to retain and support the filter medium and yet another component for centering the fabric liner in the wire mesh basket. All of these various seals and related components obviously present complications in the design, installation and maintenance of the equipment, all of which accumulates expense and inconvenience and hence constitutes a point at which substantial improvement in filter units of this type has long been desirable but not available in the past insofar as we are aware.

In addition to the multiplicity of sealing points and components as above-mentioned, the necessity for centering of the liner in the filter basket, as above referred to, has in the past presented difficulty. It has been well understood in the past that the liner must lie flat and smooth against the filter basket. If the liner is too large it will provide folds against the filter basket and improperly reduce the amount of liquid passing therethrough. On the other hand, if the liner is too small and fails to lie snugly against the filter basket it will not receive the proper support thereby and may break. Further, even when the liner used is of precisely the correct size, it must be exactly centered in the filter basket for otherwise one side will tend to fold against the basket and the other side will be spaced against the basket with the same difficulties as above-mentioned. While it is entirely possible for the filter liner and filter basket to be obtained in the correct relative sizes by proper control of purchasing from suppliers, it is still necessary for both the filter manufacturer and the user to expend considerable time and effort in the assembly of these components to insure that they are properly centered as above-mentioned, both in the initial assembly thereof and in subsequent inspection and/or replacement. This is a source of substantial expense in both the manufacture and maintenance of this type of filter which source of expense it is desirable to reduce or eliminate if possible.

Accordingly, the objects of the invention include:

1. To provide a filter design, and seal for use therewith, which will permit the filter to be opened for replacement of components therein and other servicing and yet which when in operating condition will effectively retain pressurized liquid inside the filter housing.

2. To provide a filter and seal design, as aforesaid, which will also effectively prevent bypassing of filtered liquid around the end of the filter unit to cause contamination of the filtered liquid by the unfiltered liquid.

3. To provide a filter and seal design, as aforesaid, wherein the seal will in addition to the sealing functions above-mentioned also act as the retaining ring and support for the top rim of the fabric filter liner which is used as the filtering medium in connection with a wire mesh basket.

4. To provide a filter and seal design, as aforesaid, which will also serve effectively and accurately to center a liner within the filter basket.

5. To provide a filter and seal construction, as aforesaid, which will perform its several functions efficiently and reliably.

6. To provide a filter and seal, as aforesaid, which will be of sufficient physical simplicity as to be economical in both original fabrication and operational maintenance.

Other objects and purposes of the invention will be apparent to persons acquainted with equipment of this type upon reading the following specification and inspecting the accompanying drawings.

SUMMARY OF THE INVENTION

Figure 1:
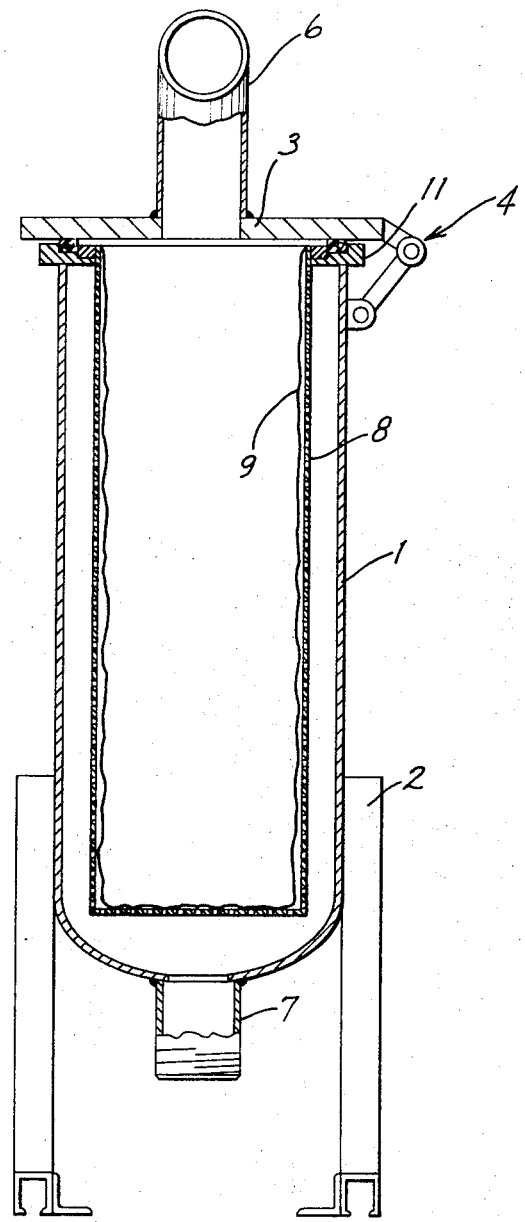
FIG. 1 is a central sectional view of a filter embodying the improved design and showing the positioning of the seal.

The seal portion of the invention is a generally annular component of substantially U-shaped cross section wherein the arms of the U are thickened toward their respective ends. The free edge of the liner is wrapped around a relatively stiff ring, which ring with the liner therein is forced between said thickened arms and received into a recess in the bottom of the U. A stepped ring has a first step for receiving and centering the basket and a second step for receiving and centering the seal ring and liner, thereby effectively and accurately centering the liner with respect to the basket. Said stepped ring is affixed rigidly to the filter housing on its lower side and removably related to the cover on its upper side, whereby the cover acts against the seal to hold it firmly in place when in operating condition but to release it for easy removal when the cover is open. Thus, the parts provide for accurate and reliable centering of the liner with respect to the basket and further provide that a single sealing member acts both as a support for the liner and as a sealing device both for sealing in the zone of the cover the inside of the housing from the outside thereof and for sealing the filtered liquid from the unfiltered liquid.

DETAILED DESCRIPTION

Referring now to the drawings, there is provided the usual filter tank or housing 1 supported as convenient by base members 2 and having a cover 3 which is supported for easy and rapid removal and replacement, in any conventional manner, as by a conventional linkage generally indicated at 4. Fastening means are likewise provided for fixing said cover in place with respect to the tank 1 which means may be of any conventional form, not here shown. An inlet 6 provides communication through the cover 3 to the interior of the tank and an outlet 7 provides discharge therefrom.

Within said tank 1 there is provided a perforated basket 8 which provides mechanical strength and backing for a filter liner 9, said latter normally being a fabric of any desired material and of such mesh as to provide whatever filtering function is required for a given installation. Said filter liner lies snugly against the filter basket in a known manner and is precisely dimensioned thereto so as to be free both of folds thereagainst (which occur when the filter liner is too large) and free of spacing therebetween (such as occurs when the filter liner is too small). Likewise the filter liner is centered precisely with respect to the filter basket inasmuch as an eccentric positioning of the liner with respect to the basket will create folds on one side and spacing on the other. Both the filter basket and the filter liner are of any conventional form, here shown as cylindrical with an open upper end and closed bottom end but will in most cases be made preferably with respectively circular upper ends.

All of the foregoing components are conventional, may be varied widely within the scope of the invention and are here shown only to provide a full understanding of the remaining portions of the apparatus.

Figure 2:
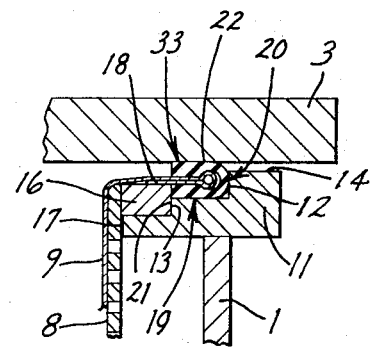
FIG. 2 is an enlarged portion of FIG. 1 showing in more detail the seal construction and the filter portions associated therewith.

Now turning to FIG. 2 for a detailing of the manner in which the parts are assembled with respect to each other in the region of the upper end of the tank 1, there is shown an annulus 11 positioned at the upper end of the tank 1 and normally fixed permanently thereto, as by welding. Said annulus 11 is provided with a pair of steps indicated at 12 and 13 and in this embodiment has a flat upper surface 14. The cover 3 when in closed position fits in this embodiment tightly against the flat surface 14 but if desired there may be a bead and groove relationship provided in the zone of the surface 14 between the annulus 11 and the cover 3.

The filter basket 8 is of any conventional design and construction in the cylindrical portion thereof and is provided at its upper end with an outwardly projecting flange 16, said flange being of size and shape to fit snugly into the recess constituting the step 13 and so dimensioned that the outer surface of the cylindrical portion will bear against the radially inner surface 17 of the annulus 11 and the upper surface 18 of the flange will be above the surface 19 of the step 12 a distance defined further below. The other surface 21 of the flange 16 should be in close proximity to the opposed surface of the annulus 11 but not necessarily in contact therewith.

Figure 3:
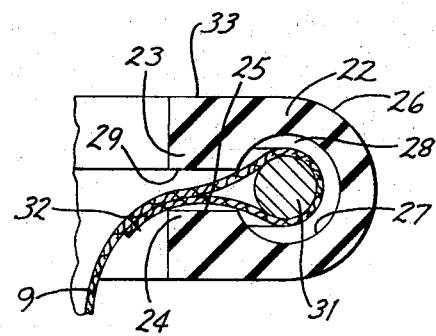
FIG. 3 is an enlarged detail showing the seal in undistorted condition and also in association with the filter liner.

The seal 22 is located as shown in FIG. 2 and is constructed as shown in more detail in FIG. 3. Said seal comprises an annular member of generally U-shaped radial cross section and having thickened portions 23 and 24 at the end portions of the arms of the U. Adjacent said thickened portions, said seal is of generally uniform thickness having both its outer periphery 26 and inner surface 27 of generally circularly arcuate radial section. Thus, there is provided an internal recess 28 having a relatively narrow mouth 29 opening to the inside of the seal annulus. Said seal is made of any convenient material, preferably an elastomeric material such as Buna-N. The liner 9 is connected at its upper end firmly to a ring 31 in any convenient manner, such as by folding the upper edge of said liner over and around said ring and returning same for fastening at point 32, such as by stitching, heat sealing or otherwise, according to the nature of the material being used. The ring 31 is made of any convenient material, preferably a slightly compressible rod (such as polypropylene) arranged and fastened in a ring formed in any convenient manner.

With the liner affixed to the ring in some effective manner, such as that above outlined, the ring is then inserted through the mouth 29 of the seal into the recess 28 in the manner shown in FIG. 3 to provide an integral liner supporting and sealing unit for positioning and use as now hereinafter described.

Referring back to FIG. 2 the seal member 22 with the liner 9 attached as above-described is positioned within the step 12. Its dimensions are such that when the lower surface thereof bears against the surface 19 of the step 12 the peripheral surface 26 thereof will bear against the opposed surface of said step 12. Preferably the upper surface 33 of said seal will at this point be slightly above the adjacent surface 14 of the annulus 11 to insure adequate contact pressure when the cover 3 is placed in position. The upper surface 18 of the flange 16 is, at least approximately, flush with the inner surface 25 of the lower leg 24 of the seal 22. Thus, the flange forms with the outer step a groove for the reception and confinement of the seal 22, said groove being defined by the radially outer surface of the flange 16, the radial surface 19 of the step 12 and the cylindrical surface 20 thereof.

Thus, the basket 8 is precisely positioned with respect to the annulus 11 and such positioning is accurately predetermined in such a manner that the assembly can be made by unskilled workmen and will still be accurate. Similarly, the seal 2 and consequently the liner 9 will be positioned equally accurately with respect to the basket 8 and may also be assembled by unskilled workmen with the assurance that the desired centering relationship will be maintained without special measures or without the intervention of skilled workmen at this point. The cover 3 may then be closed and fastened as convenient and it will effectively compress the seal 22 to insure that it bears tightly against the inner surface of the cover 3, the radial surface 19 of the step 12 and the cylindrical surface 20 of the step 12. With the seal so positioned and in view of its relationship to the remaining parts it will be clear upon inspection of FIG. 2 that fluid under pressure anywhere within the housing will (1) be sealed against escape therefrom between the cover 3 and the surface 14 of the annulus 11 and (2) unfiltered fluid will be prevented from bypassing from within the liner 9 around the periphery thereof to any point outside of said liner 9.

It will also be recognized that while a major sealing forces originates with the fastening of the cover as abovementioned, there will also be pressurized fluid entering from the interior of the tank into the cavity 28 of the seal which will tend to spread the legs of the U-shaped seal into still tighter engagement with the surfaces 33, 20 and 19 and hence still further insure a tight seal for the purposes above outlined. The compression of the two legs of the seal toward each other by the closure of the cover 3 presses same tightly against the ring 31 and the fabric wrapped therearound to insure that no liquid can pass from within the liner around the edge thereof to any point outside of said liner. Thus, all sealing functions above outlined are effectively carried out together with the centering function above also set forth.

It will be further appreciated that with a seal of the shape shown it will be virtually impossible to extrude same between the cover and the annulus 11 even though some space remains therebetween after closure of the cover. Further, it will be recognized that the parts are much simpler to manufacture and install than where other seals such as O-rings are used separately on either side of the liner or rim supporting same which O-rings are normally required to be recessed into grooves which grooves require further expense in the manufacture thereof and the assembly of O-rings thereinto.

The specific components may be modified freely without departing from the principles herein set forth and the seal here disclosed and described may be applied to a wide range of specific filter designs. Thus, while a specific embodiment has been utilized herein for illustrative purposes, same may be modified widely without departing from the scope of the hereinafter appended claims excepting as said claims by their own terms expressly require otherwise.

The embodiments of the invention in which an exclusive property or privilege is claimed are defined as follows:

1. In a filter construction including a filter tank having an unfiltered liquid zone and a filtered liquid zone, a filter basket and filter liner lining said basket for separating said two zones, an inlet into the unfiltered liquid zone, an outlet from the filtered liquid zone and means for centering said filter liner with respect to the filter basket and for sealing both against the bypassing of unfiltered liquid around the edge of said filter liner and against leakage of liquid from within the tank between its upper edge and a removable cover, the improvement in said lastnamed means comprising:

an annulus at the upper edge of said tank and below said cover, said annulus having at least two internally facing steps therein;
  an outwardly projecting flange on said filter basket receivable snugly within the innermost of said steps;
  a resilient seal around the edge of said liner and received snugly in the radially outermost of said steps and normally projecting beyond the free axial end of said annulus;
  whereby when said cover is placed in operating position, said seal is compressed and functions to prevent the escape of liquid from within said filter outwardly between the cover and said annulus and functioning further to prevent the escape of liquid around the free edge of said liner from the unfiltered zone to the filtered zone.

2. The device of claim 1, wherein said flange projects axially beyond the radial surface of the outermost step to define with the axial surface of said outermost step a groove into which said seal may be received whereby when said seal is compressed it will bear snugly against the cover, said annulus and at least a portion of the outer surface of said flange.

3. The device of claim 1, wherein said seal is of generally U-shaped in radial section.

4. The device of claim 1, wherein said seal is generally U-shaped in radial section and has thickened portions near the end of said U whereby to define a recess therewithin of larger dimension than the space between the ends of the U.

5. The device of claim 4, including a ring for holding the outer edges of said filter liner and receivable into said recess whereby said liner, ring and seal provide an integrated unit for quick assembly with respect to said basket by placement of said flange on said innermost step followed by placement of said seal on the outermost step.

6. The device of claim 5, wherein both of said seal and said ring are made of compressible material for improving the sealing relationship therebetween.

* * * * *